US005818513A

United States Patent [19]
Sano et al.

[11] Patent Number: 5,818,513
[45] Date of Patent: Oct. 6, 1998

[54] MULTI-SITE VIDEO CONFERENCE CONTROL SYSTEM AND METHOD FOR CONTROLLING VIDEO CONFERENCE TERMINALS VIA COMMUNICATION LINES

[75] Inventors: Shoichi Sano; Hitoshi Takei; Hiroaki Natori; Masanobu Hatanaka; Shoichi Tamuki; Reiko Okazaki, all of Kawasaki, Japan

[73] Assignee: Fujitsu Limited, Kawasaki, Japan

[21] Appl. No.: 243,835

[22] Filed: May 17, 1994

[30] Foreign Application Priority Data

Jul. 29, 1993 [JP] Japan .................................. 5-188472

[51] Int. Cl.⁶ .............................. H04N 7/15; H04N 5/36
[52] U.S. Cl. .......................... 348/15; 379/158; 379/202; 370/62
[58] Field of Search .................................. 348/15 OR, 14, 348/13, 16, 17, 12; 379/158, 202, 251; 370/62; 455/4.1, 4.2, 5.1; H04N 7/15, 5/36

[56] References Cited

U.S. PATENT DOCUMENTS

| | | | |
|---|---|---|---|
| 3,601,530 | 8/1971 | Edson et al. | 348/15 |
| 4,531,024 | 7/1985 | Colton et al. | 348/15 |
| 4,995,071 | 2/1991 | Weber et al. | 379/53 |
| 5,408,526 | 4/1995 | McFarland et al. | 379/202 |

FOREIGN PATENT DOCUMENTS

| | | | |
|---|---|---|---|
| 650736 | 10/1992 | Australia | 379/202 |
| 351 757 | 1/1990 | European Pat. Off. | H04M 3/56 |
| 1270441 | 10/1989 | Japan | 379/202 |

OTHER PUBLICATIONS

"Multipoint Multimedia Conference", IEEE Communications Magazine, May 1992, pp. 44–50.
IEEE INFOCOM' 91—The Conference on Computer Communications—Proceedings vol. 3, 11 Apr. 1991, Bal Harbour, FL, pp. 1127–1144, Tanigawa et al, "Personal Multi-media–Multipoint Teleconference System".

Primary Examiner—Nathan J. Flynn
Attorney, Agent, or Firm—Staas & Halsey

[57] ABSTRACT

A multi-site video conference control system comprising a number of video conference terminals respectively situated at a number of sites and a video conference control unit for controlling a video conference. A communication line interface provided at each terminal makes a single calling with respect to the video conference control unit. A connection data section, which is provided at each terminal, manages connection data for other terminals to be connected and transmits the connection data to the video conference control unit. A control calling section, which is provided at the video conference control unit, calls the terminal corresponding to the connection data to be transmitted from the connection data section, based on the single calling. A connection controller, which is provided at the video conference control unit, connects the calling terminal, whose communication line interface made the single calling, and the other terminals called by the control calling section, with communication lines.

33 Claims, 13 Drawing Sheets

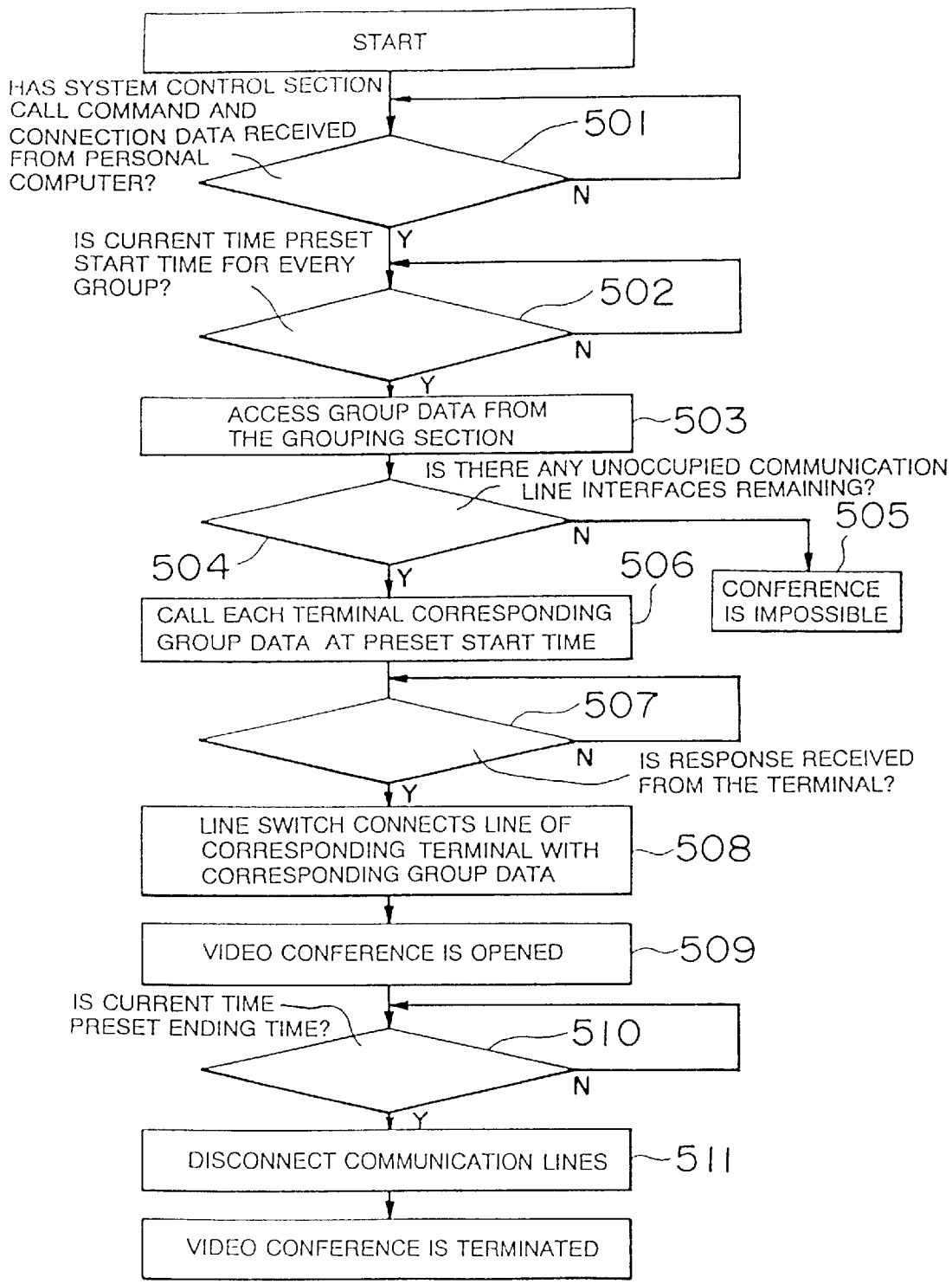

MULTI-SITE VIDEO CONFERENCE CONTROL SYSTEM AND METHOD FOR CONTROLLING VIDEO CONFERENCE TERMINALS VIA COMMUNICATION LINES

BACKGROUND OF THE INVENTION

1. Field of the Invention

The present invention relates to a system for and a method of controlling a multi-site video conference to be held by connecting a number of video conference terminals, which are respectively situated at a number of sites, with a video conference control unit via communication lines.

2. Description of the Related Art

In a multi-site video conference control system, a number of video conference terminals (hereinafter referred to as the terminals) respectively situated at a number of sites are able to be connected to a video conference control unit via communication lines. The video conference control unit opens a video conference between the terminals. At that time, each terminal searches for a corresponding one of ports provided at the video conference control unit and calls the corresponding port.

When it receives responses from all terminals, the video conference control unit connects the respective terminals with corresponding communication lines to open the video conference.

The video conference control unit has three ports, for example. A 64 kps ISDN line composed of B channels and a D channel is connected to each port. The rate of B channel is 24 kps, and that of D channel is 16 kps. The sum of two B channels's rate and one D channel's rate is 64 kps as mentioned above.

Specifically, a first terminal calls a dial number #001 with respect to a first port of the video conference control unit. A second terminal calls a dial number #002 with respect to a second port. Likewise a third terminal calls a dial number #003 with respect to a third port.

If the number of terminals is equal to or less than the number of ports of the video conference control unit, it is only essential that the respective terminal calls the corresponding port of the video conference control unit.

On the contrary, if the number of terminals is larger than that of ports, the terminal must search for any unoccupied port of the video conference control unit.

Consequently, for example, if a single channel is connected with each port, a common dial number is used with respect to all ports of the video conference control unit. Using this common number, the terminals are automatically connected to unoccupied ports one after another in the order of dialing.

However, assuming that such common number is used and, for example, B channels and D channel are used with respect to each terminal, when a calling is made from the second terminal between the callings of first and second B channels of the first terminal, B channels from the second terminal is connected to the first port. As a result, D channel from the first terminal will be connected to the second port. Therefore, when a number of channels are to be used with respect to each terminal, it is not suitable to use a common number. Accordingly a system for connecting the terminals with the video conference control unit in a simple operation without using any common number is wanted for.

SUMMARY OF THE INVENTION

It is therefore an object of the present invention to provide a system for and a method of controlling a multi-site video conference which enables connecting a number of video conference terminals, which are respectively situated at a number of sites, with a video conference control unit via communication lines in a simple operation.

According to a first aspect of the present invention, a system for controlling a multi-site video conference comprises a number of video conference terminals, a video conference control unit, communication line interfaces, a connection data section, a control calling section, and a connection controlling section. The video conference terminals are respectively situated at a number of sites. The video conference control unit is operable to interconnect the terminals via communication lines to open a video conference.

The communication line interfaces are provided one at each terminal for calling the video conference control unit. Each connection data section is provided in the respective terminal for managing connection data for the terminals to be connected and for transferring the connection data to the video conference control unit.

The control calling section is provided in the video conference control unit for calling the terminals corresponding to the connection data transferred from the connection data section, based on the calling by the communication line interface of the calling terminal. The connection controlling section also is provided in the video conference control unit for connecting the calling terminal, whose communication line interface called the video conference control unit, and the other terminals called by the control calling section, with communication lines.

According to a second aspect of the present invention, a multi-site video conference control system comprises a number of video conference terminals, a video conference control unit, a control terminal, a control port, a control calling section, and a connection controlling section. The video conference terminals are respectively situated at a number of sites. The video conference control unit is operable to interconnect the terminals via communication lines to open a video conference.

The control terminal manages connection data for all of the terminals to be connected and transfers the connection data to the video conference control unit. The control port is provided in the video conference control unit for receiving the connection data transferred from the control terminal. The control calling section is provided in the video conference control unit and makes calling with respect to all of the terminals, corresponding to the connection data supplied from the control ports, to connect these terminals with communication lines. The connection control section is provided in the video conference control unit for connecting all of the terminals called by the control calling section, with communication lines.

In addition, according to the present invention, a method of controlling a multi-site video conference to be held by connecting a number of video conference terminals, which are respectively situated at a number of sites, with a video conference control unit via communication lines comprises a communication line step, a connection data step, a control calling step, and a connection controlling step.

The communication line step is provided for calling the video conference control unit. The connection data step is provided for managing connection data for the terminals to be connected and transferring the connection data to the video conference control unit.

The control calling step is provided for calling the terminals corresponding to the transferred connection data, based on the calling in the communication line step.

The connection controlling step is provided for connecting the calling terminal, which called the video conference control unit in the communication line step, and the other terminals called in the control calling step, with communication lines.

According to the present invention, a method of controlling a multi-site video conference to be held by connecting a number of video conference terminals, which are respectively situated at a number of sites, with a video conference control unit via communication lines comprises a data processing step, an input step, a control calling step, and a connection controlling step. The data processing step is provided for managing connection data for all of the terminals to be connected and transferring the connection data to the video conference control unit. The input step is provided for supplying to control ports the transferred connection data. The control calling step is provided for calling all of the terminals corresponding to the connection data supplied from the control ports. The connection controlling step is provided for connecting all of the terminals, which made the calling in the control calling step, with communication lines.

In the multi-site video conference control system according to the first aspect of the present invention, when the communication line interface in any of the terminals makes a single calling with respect to the video conference control unit, the connection data section transfers to the video conference control unit the connection data for the terminals to be connected.

Then, in the video conference control unit, the control calling section calls the terminals corresponding to the connection data transferred from the connection data section, based on the single calling by the communication line interface. Subsequently, the connection control section connects the calling terminal, whose communication line interface called the video conference control unit, and the terminals called by the control calling section, with communication lines.

Partly since a single calling operation is performed from a single terminal and partly since connection data is used, no calling operation is necessary for the other terminals. Therefore it is possible to interconnect the terminals and the video conference control unit in a simple operation. More particularly it would be unnecessary to search for any unoccupied port of the video conference control unit.

In the multi-site video conference control system according to the second aspect of the present invention, when the control terminal transfers to the video conference control unit the connection data for the terminals to be connected, the control port receives the connection data transferred from the control terminal.

Then when the control calling section calls the terminals corresponding to the connection data supplied from the control port, the connection control section connects the terminals called by the control calling section, with communication lines.

Therefore, only to supply the connection data from the control terminal would make the calling operation for the terminals, which are to be connected, unnecessary.

BRIEF DESCRIPTION OF THE DRAWINGS

FIG. 13 is a flow chart illustrating a multi-site video conference controlling method according to the fifth embodiment of the present invention.

DETAILED DESCRIPTION OF THE PREFERRED EMBODIMENTS

Figure 1:
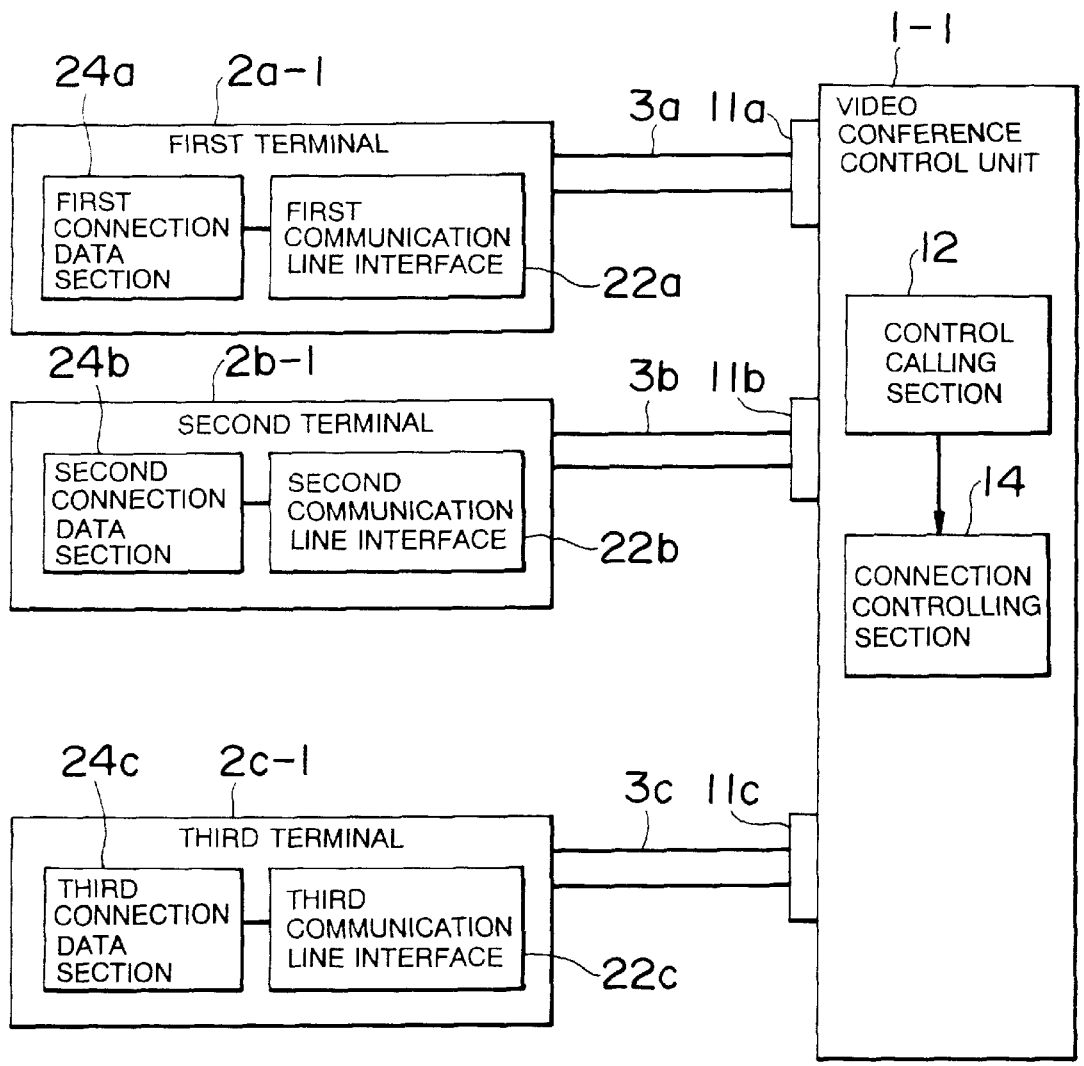
FIG. 1 is a structural block diagram showing a multi-site video conference control system according to a first embodiment of the present invention.

Embodiments of a system for and a method of controlling a multi-site video conference according to this invention will now be described with reference to the accompanying drawings. FIG. 1 is a structural block diagram showing a multi-site video conference control system according to a first embodiment of the present invention.

<Embodiment 1>

In the multi-site video conference control system of the first embodiment, a number of video conference terminals respectively situated at a number of sites are connected with a video conference control unit via communication lines to open a video conference. More specifically, this system comprises first through third video conference terminals 2a-1, 2b-1, and 2c-1 situated one at each site, and a video conference control unit 1-1. Each of first through third communication lines 3a through 3c is a 64 kps ISDN line composed of two B channels and a D channel. The rate of B channel is 24 kps, and that of D channel is 16 kps. The sum of two B channels' rate and one D channel's rate is 64 kps.

The video conference control unit 1-1 is adapted to be connected with the first through third terminals 2a-1 through 2c-1 via the first through third communication lines 3a through 3c, respectively, for controlling the opening and operation of a multi-site video conference.

Each of the terminals 2a-1 through 2c-1 performs image display and sound input/output by visual data and audio data. The first terminal 2a-1 has a first communication line interface 22a and a first connection data section 24a. The second terminal 2b-1 has a second communication line interface 22b, and a second connection data section 24b.

Likewise the third terminal 2c-1 has a third communication line interface 22c and a third connection data section 24c.

Each of the first through third communication line interfaces 22a through 22c inputs and outputs voice and sends a dial number to or calls the video conference control unit 1-1.

Each of the first through third connection data sections 24a through 24c manages the respective inherent dial number for each terminal as connection data for the terminals to be connected, and transfers the connection data to the video conference control unit 1-1.

The video conference control unit 1-1 comprises first through third communication line interfaces 11a through 11c, a control calling section 12, and a connection control section 14.

The first through third communication line interfaces 11a through 11c serve as ports to be connected with the communication lines and are provided in association with the first through third terminals 2a-1 through 2c-1, respectively.

The control calling section 12 calls from the communication line interfaces the terminals corresponding to connection data transferred from the connection data section in any one of the terminals, based on the calling by the communication line interface in the any one of the terminals.

The connection control section 14 connects the terminals called by the communication line interface in any one of the terminals and those called by the control calling section 12, with the communication lines.

The control calling section 12 and the connection control section 14 are operable as a central processing unit (CPU) executes a program stored in memories.

Figure 2:
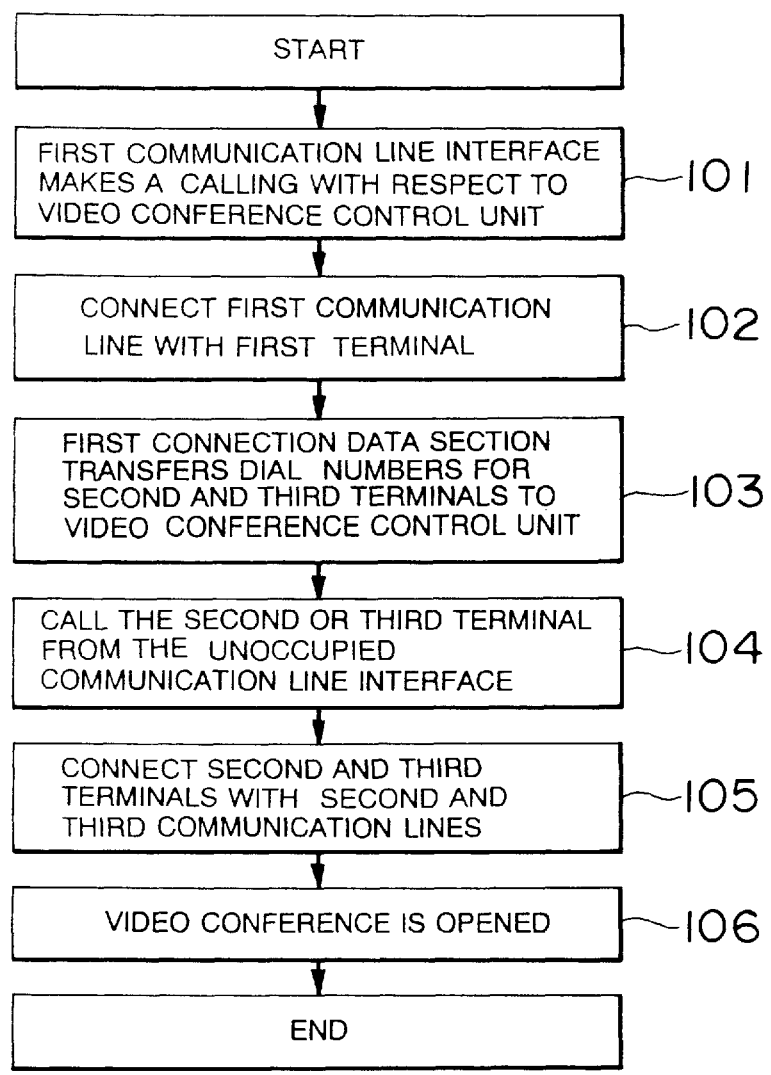
FIG. 2 is a flow chart illustrating a multi-site video conference control method according to the first embodiment of the present invention.

FIG. 2 is a flow chart illustrating a multi-site video conference control method according to the first embodiment of the present invention. This method will be described in connection with an example when calling is made just from the first terminal 2a-1. Since the calling from any other terminal will cause the same operation, its description for other terminals is omitted here.

First, the communication line interface 22a in the first terminal 2a-1 makes a single calling with respect to the video conference control unit 1-1 (Step 101). The video conference control unit 1-1 connects the first communication line 3a with the first terminal 2a-1 (Step 102). The first communication line interface 11a is thereby connected with the first communication line 3a.

Subsequently, the first connection data section 24a transfers to the video conference control unit 1-1 dial numbers for the second and third terminals 2b-1 and 2c-1, respectively (Step 103).

The control calling section 12 calls, from the unoccupied second or third communication line interface 11b or 11c, the second or third terminal 2b-1 or 2c-1 corresponding to the respective dial numbers (Step 104).

Further, if responses are received from the second and third terminals 2b-1 and 2c-1, the connection control section 14 connects the second and third terminals 2b-1 and 2c-1 with the second and third communication lines 3b and 3c, respectively (Step 105).

As a result, the second communication line interface 11b is connected with the second communication line 3b, and the third communication line interface 11c is connected with the third communication line 3c. Then the video conference is started (Step 106).

Thus, in the first embodiment, it is possible to start the video conference by making only a shingle calling from the first terminal 2a-1 without calling from other terminals. It is therefore possible to connect the terminals with the video conference control unit 1-1 in a simple operation. In particular, it would be unnecessary to search for any unoccupied communication line interface of the video conference control unit 1-1.

<Embodiment 2>

Figure 3:
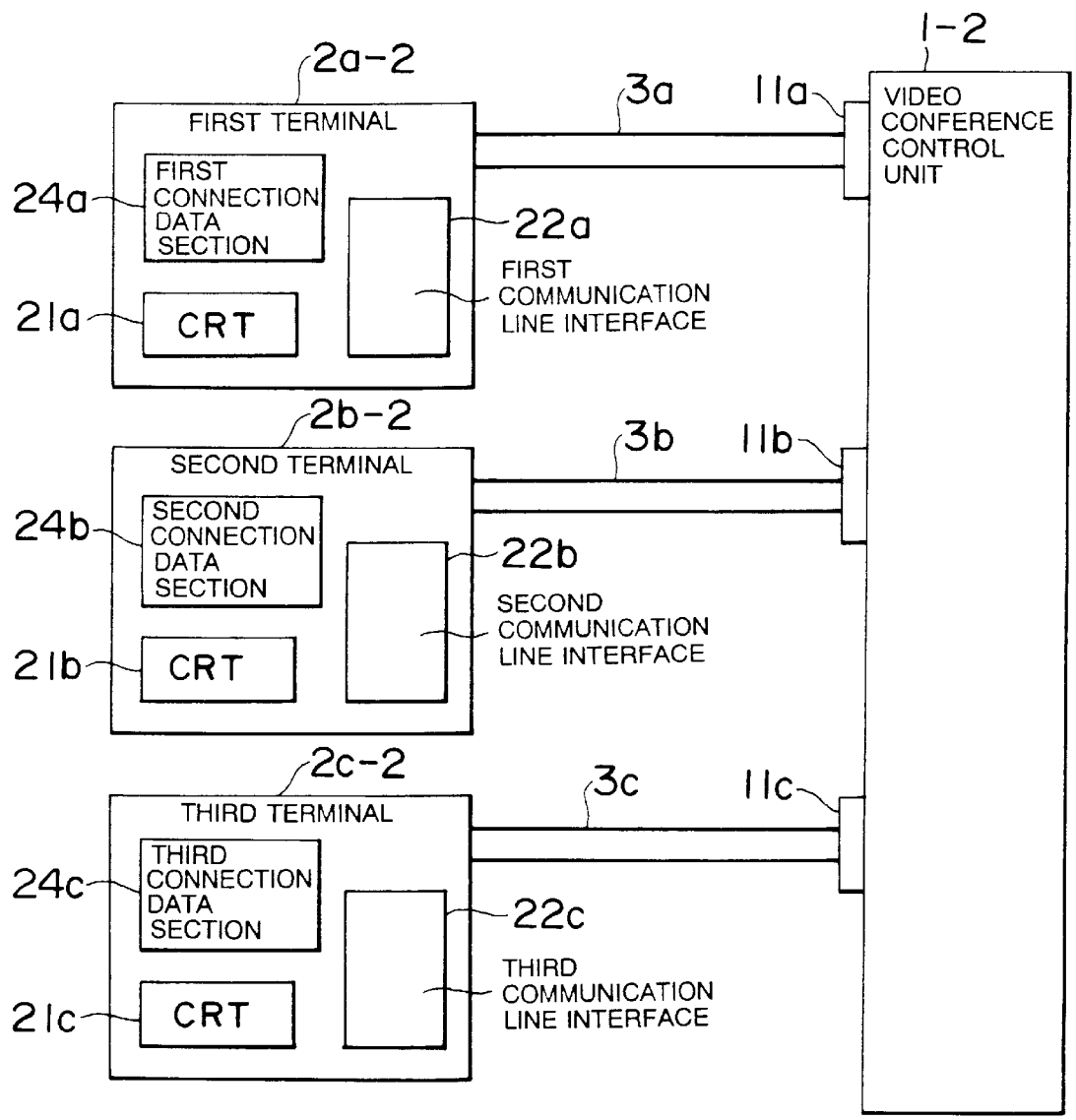
FIG. 3 is a structural block diagram showing a multi-site control system according to a second embodiment of the present invention.

A a system for and a method of controlling a multi-site video conference according to a second embodiment of the present invention will now be described. The second embodiment is a specific example of the first embodiment. FIG. 3 is a structural block diagram showing the multi-site video conference control system of the second embodiment.

The multi-site video conference control system of the second embodiment comprises first through third video conference terminals 2a-2, 2b-2, 2c-2, and a video conference control unit 1-2.

The first terminal 2a-2 comprises a CRT 21a, a first communication line interface 22a and a first connection data section 24a. The second terminal 2b-2 comprises a CRT 21b, a second communication line interface 22b and a second connection data section 24b. Likewise the third terminal 2c-2 comprises a CRT 21c, a third communication line interface 22c and a third connection data section 24c. The CRTs 21a, 21b and 21c produce visual data.

Figure 4:
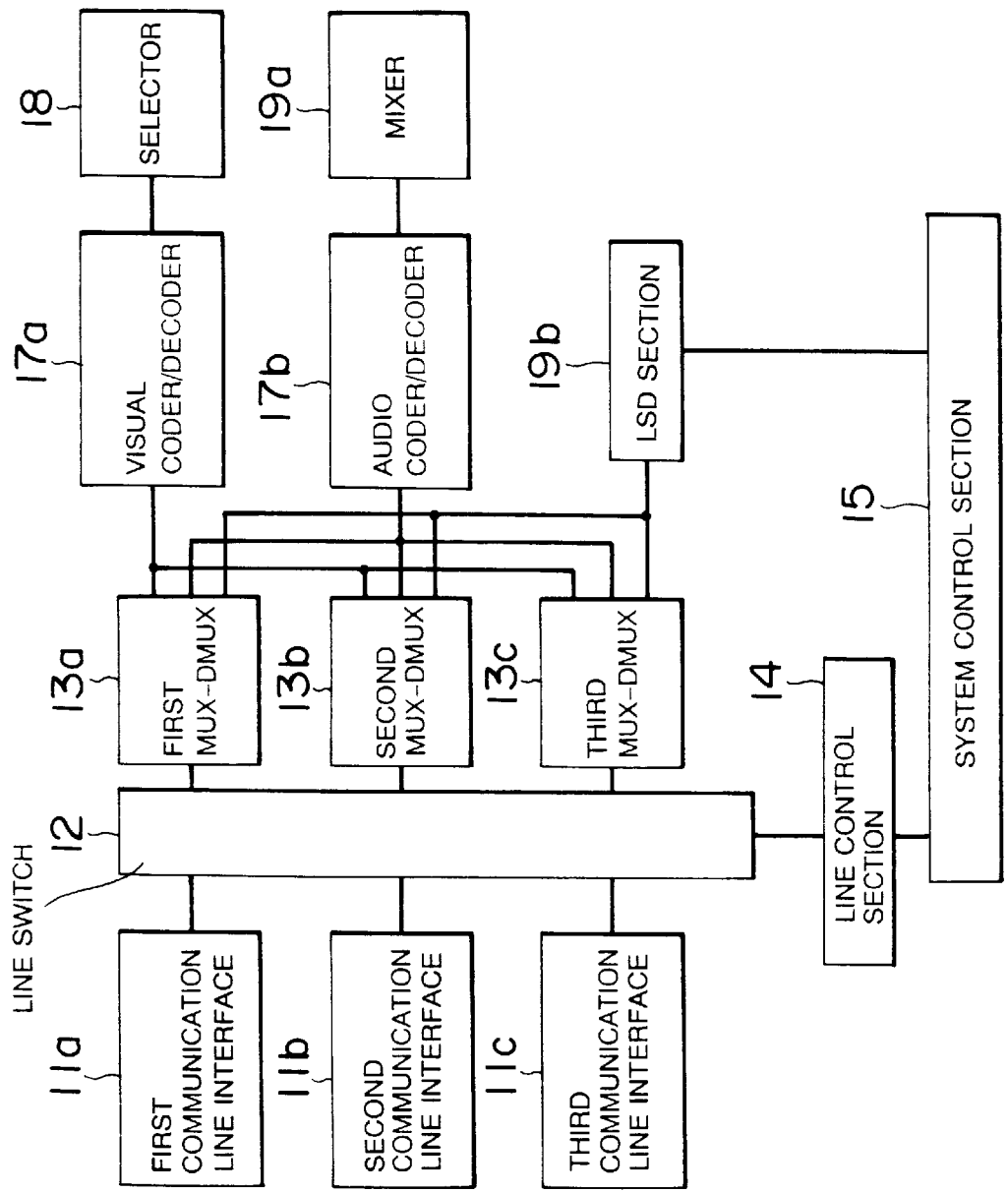
FIG. 4 is a structural block diagram showing a video conference control unit of the second embodiment.

FIG. 4 is a structural block diagram showing the video conference control unit 1-2 of the second embodiment. In FIG. 4, each of the first through third communication line interfaces 11a through 11c serves as a port and is provided in association with a respective one of the first through third terminals 2a-2 through 2c-2. Each of the communication line interfaces 11a through 11c connects the corresponding one of the first through third terminals 2a-2 through 2c-2 with a line switch 12.

The line switch 12 connects the first through third communication line interfaces 11a through 11c with first through third multiplexer/demultiplexers (hereinafter referred to as MUX/DMUXs) 13a through 13c in response to a control signal supplied from a line control section 14.

Each of the first through third MUX/DMUXs 13a through 13c is composed of an MUX and a DMUX. The DMUX separates visual data, audio data, calling data, and control data such as connection data, all from the terminals. The MUX multiplexes visual data, audio data and control data. The control data is also called low speed data (LSD).

A visual coder/decoder 17a is composed of a visual coder and a visual decoder. The visual decoder detects a frame of the visual data from the first MUX/DMUX 13a and corrects possible errors to supply only effective data to a selector 18. The visual coder frames data from the selector 18 and adds error correction bits to the framed data to supply the resultant data to the first MUX/DMUX 13a.

The selector 18 selects, in response to a control signal supplied from a system control section 15, certain communication lines 3a through 3c to which visual data is to be transmitted. An audio coder/decoder 17b is composed of an audio coder and an audio decoder. The audio decoder detects audio data from the second MUX/DMUX 13b and corrects possible errors to supply only effective data to a mixer 19a. The audio coder adds error correction bits to the data from the mixer 19 and to supplies the resultant data to the second MUX/DMUX 13b. The mixer 19a sums various audio data from the individual communication lines 3a through 3c and supplies the resultant data to each of the communication lines 3a through 3c.

An LSD section 19b translates the control data from the first through third terminals 2a-2 through. 2c-2 to supply the resultant data to the system controlling section 15 which controls the whole system. The line control section 14 controls the line switch 12 in response to a control signal from the system control section 15.

The other parts or elements are similar in construction to those of the first embodiment and are therefore designated by the same reference numerals; so their detailed description is omitted.

Figure 5:
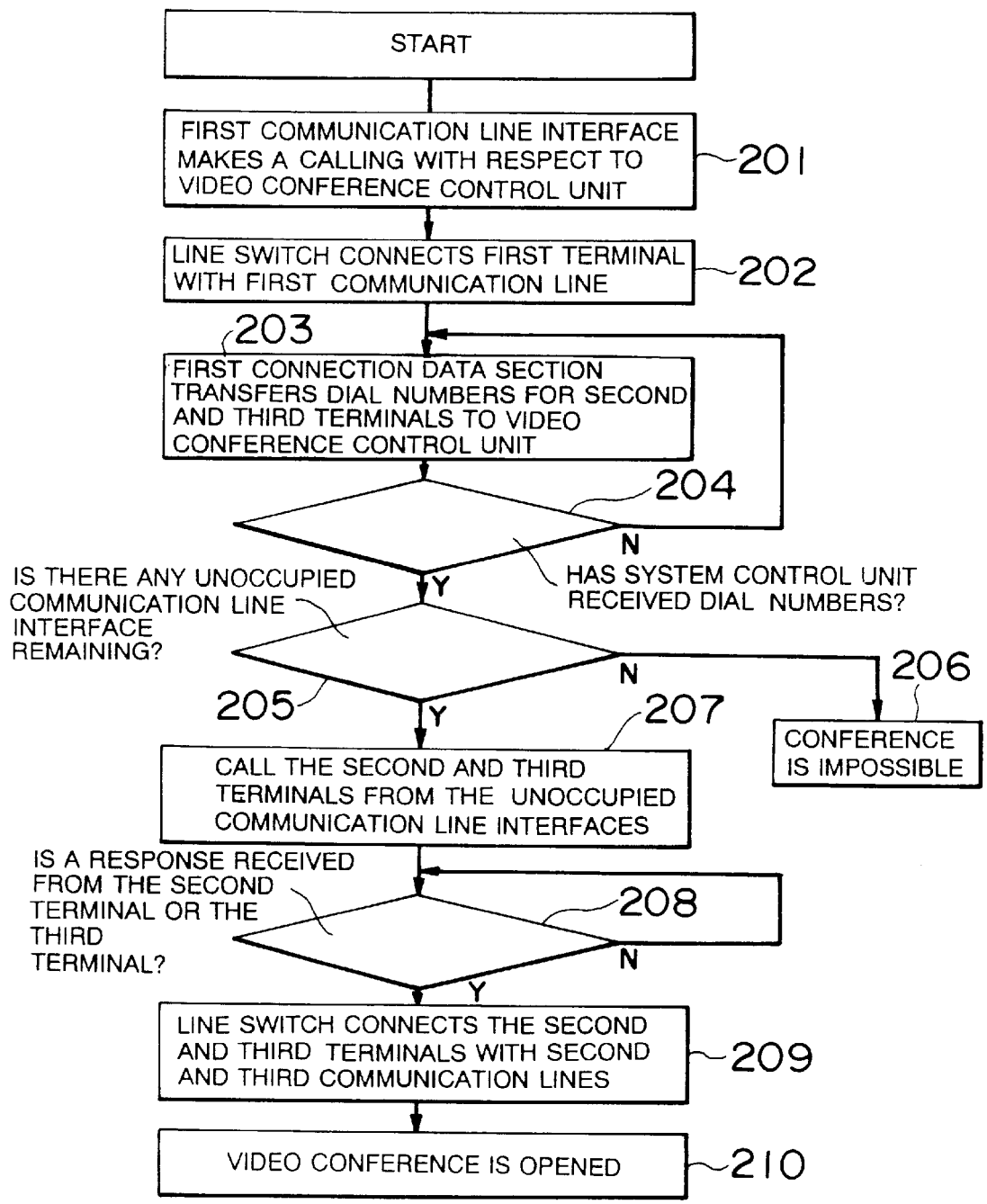
FIG. 5 is a flow chart illustrating a multi-site video conference controlling method according to the second embodiment of the present invention.

FIG. 5 is a flow chart illustrating the multi-site video conference control method according to the second embodiment of the present invention. This method will be described in connection with an example when calling is made from the first terminal 2a-2. Since the calling from any other terminals will cause the same operation, its description for other terminals is omitted here.

First, the first communication line interface 22a in the first terminal 2a-2 makes a single calling with respect to the video conference control unit 1-2 (Step 201). In the video conference control unit 1-2, the line control section 14 renders the line switch 12 operative to connect the first terminal 2a-2 with the first communication line 3a (Step 202). In other words, the first communication line interface 11a is connected with the first MUX/DMUX 13a through the line switch 12.

Then the first connection data section 24a transfers to the video conference control unit 1-2 dial numbers for the second and third terminals 2b-2 and 2c-2 (Step 203). Visual data, audio data and dial numbers from the first terminal 2a-2 are separated by the first MUX/DMUX 13a. The visual data is transmitted to the visual coder/decoder 17a, the audio data is transmitted to the audio coder/decoder 17b, and the dial numbers are supplied to the LSD section 19b.

Meanwhile, the system control unit 15 determines whether or not the dial numbers have been received from the LSD section 19b (Step 204). Here in the illustrative example, the system control section 15 receives the dial numbers and determines whether or not there is any unoccupied communication line interface remaining (Step 205). In the absence of any unoccupied communication line interface, the conference cannot be open (Step 206).

If there is any unoccupied communication line interfaces, the system control section 15 calls the second and third terminals 2b-2 and 2c-2 corresponding to the dial numbers from the unoccupied second and third communication line interfaces 11b and 11c, respectively (Step 207).

Further, the system control section 15 determines whether or not a response has been received from the second terminal 2b-2 or the third terminal 2c-2 (Step 208). In the presence of such response, the line control section 14 which has received the dial numbers from the system control section 15 controls the line switch 12.

More specifically, the line control section 14 renders the line switch 12 operative to connect the second and third terminals 2b-2 and 2c-2 with the second and third communication lines 3b and 3c (Step 209). The line switch 12 thereby connects the second communication line interface 11b with the second MUX/DMUk 13b. Likewise the third communication line interface 11c is connected with the third MUX/DMUX 13c.

Further, visual data is processed into effective data by the visual coder/decoder 17a and is then distributed to the second and third destination terminals 2b-2 and 2c-2 by the selector 18. Various audio data are summed by the mixer 19 and are distributed to the second and third destination terminals 2b-2 and 2c-2. As a result, a multi-site video conference is now ready to open (Step 210).

Thus in the second embodiment, it is possible to start the video conference by making only a single calling from the first terminal 2a-2 without calling from other terminals. It is therefore possible to connect the terminals with the video conference control unit in a simple operation. In particular, it would be unnecessary to search for any unoccupied communication line interface of the video conference control unit.

<Embodiment 3>

Figure 6:
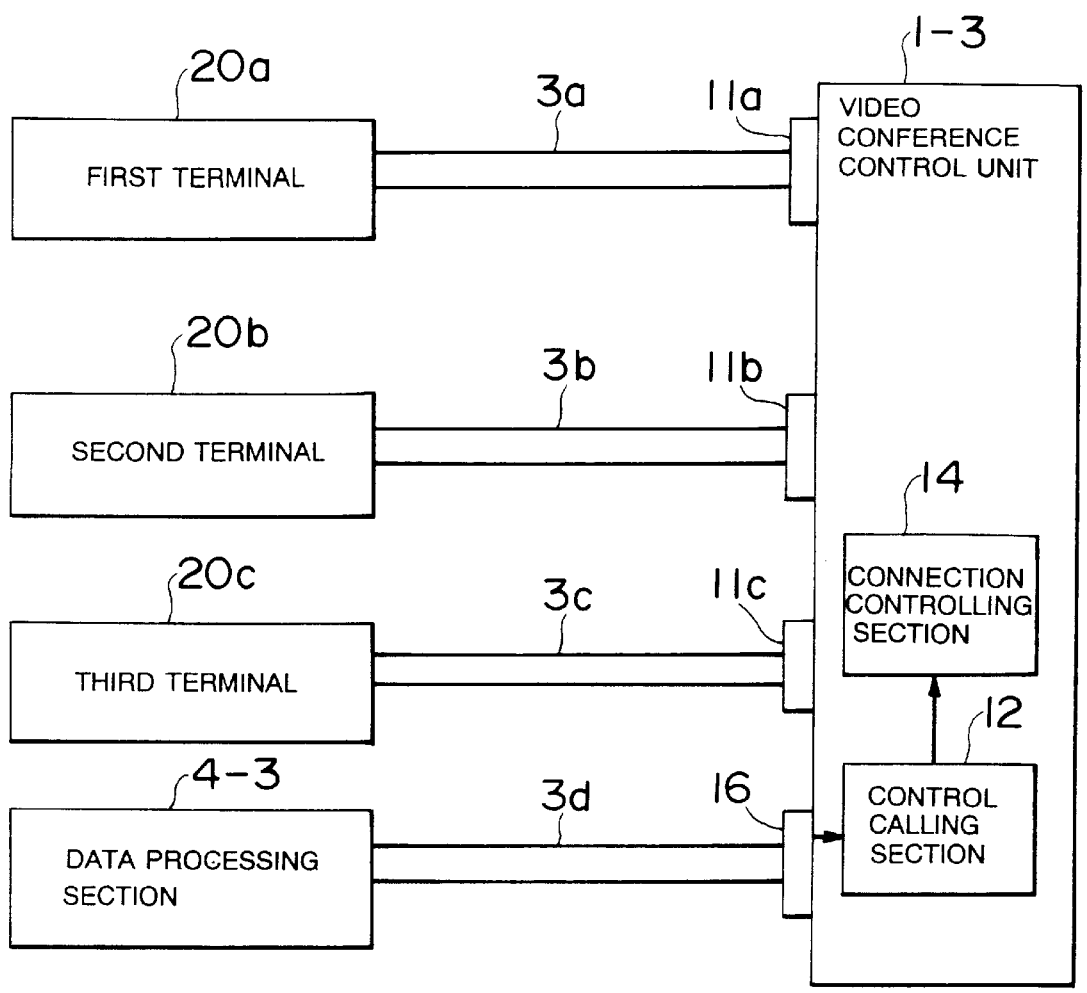
FIG. 6 is a structural block diagram showing a multi-site video conference control system according to a third embodiment of the present invention.

A third embodiment of the present invention will now be described. FIG. 6 is a structural block diagram showing a multi-site video conference control system according to the third embodiment. This system comprises first through third terminals 20a through 20c, a data processing section 4-3, and a video conference control unit 1-3.

The first through third terminals 20a through 20c are designed so as to wait any calling from the video conference control unit 1-3 without calling the video conference control section 1-3. The video conference control unit 1-3 comprises first through third communication line interfaces 11a through 11c associated with the first through third terminals, a control port 16, a control calling section 12, and a connection control section 14.

The control port 16 is connected with the control calling section 12. The control port 16 is also connected with the data processing section 4-3 via a fourth communication line 3d.

The data processing section 4-3 serves as a control terminal. The data processing section 4-3 manages connection data for all of the terminals to be connected and supplies the connection data to the control calling section 12 via the control port 16.

The control calling section 12 calls the individual terminals via the communication line interfaces 11a through 11c according to the connection data received from the data processing section 4-3 via the control port 16.

Figure 7:
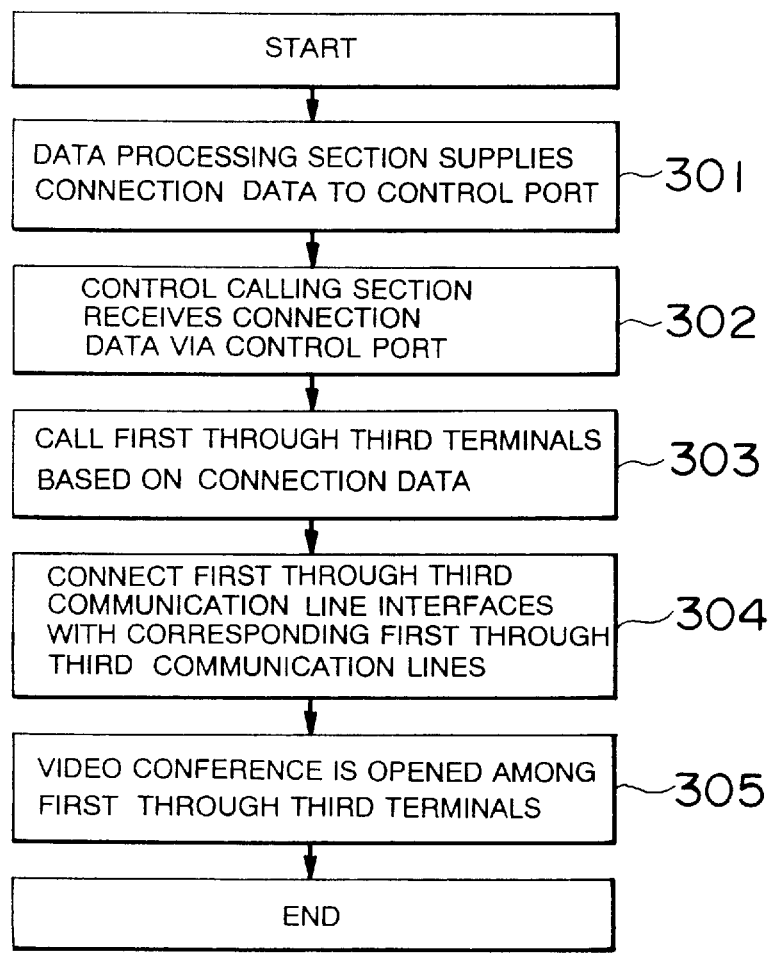
FIG. 7 is a flow chart illustrating a multi-site video conference controlling method according to the third embodiment of the present invention.

FIG. 7 is a flow chart illustrating a multi-site video conference controlling method according to the third embodiment of the present invention.

A multi-site video conference control method according to the third embodiment will now be described with reference to FIG. 7.

First, the data processing section 4-3 supplies to the control port 16 the connection data for all of the terminals to be connected (Step 301). The control calling section 12 receives the connection data via the control port 16 (Step 302).

The control calling section 12 calls the first through third terminals 20a through 20c from the first through third communication line interfaces 11a through 11c based on the connection data (Step 303).

Further, in the video conference control unit 1-3, when a response is received from the first through third terminals 20a through 20c, the connection control section 14 connects the first through third communication line interfaces 11a through 11c with the corresponding first through third communication lines 3a through 3c (Step 304). In other words, the first through third communication line interfaces 11a through 11c are connected with the first through third terminals 20a through 20c.

A multi-site video conference is thereby ready to open in which visual data and audio data are communicated among the first through third terminals 20a through 20c (Step 305).

Thus it becomes possible to start the video conference by inputting the connection data from the control port 16

<Embodiment 4>

Figure 8:
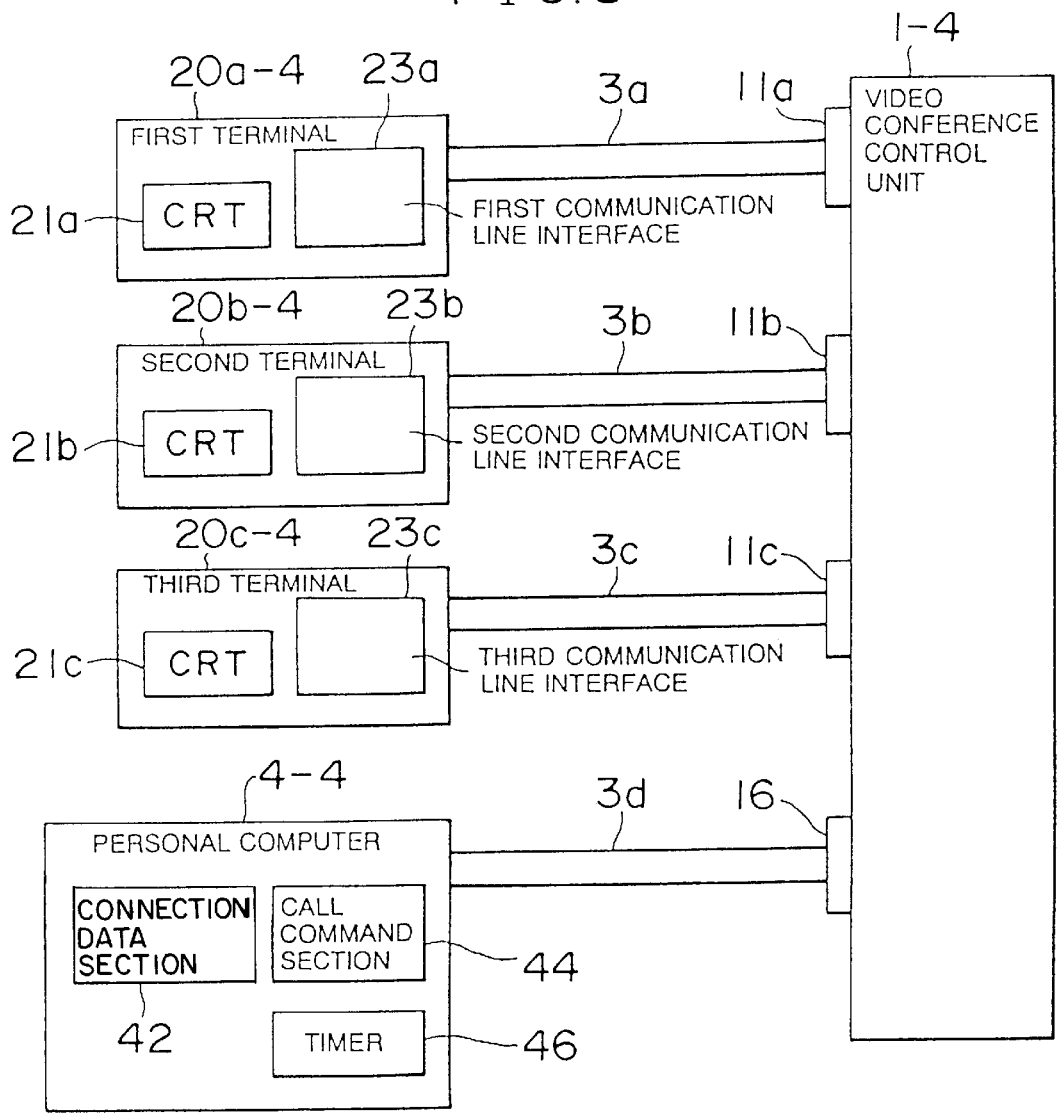
FIG. 8 is a structural block diagram showing a multi-site video conference control system according to a fourth embodiment of the present invention.

A fourth embodiment of the present invention will now be described. The fourth embodiment is a specific example of the third embodiment. FIG. 8 is a structural block diagram showing a multi-site video conference control system according to the fourth embodiment. This system comprises first through third terminals 20a-4 through 20c-4, a personal computer 4-4, and a video conference control unit 1-4. The video conference control unit 1-4 comprises first through third communication line interfaces 11a through 11c associated with the first through third terminals, and a control port 16.

The control port 16 is connected with the personal computer 4-4, which is to be used as a control terminal, via a fourth communication line 3d.

The personal computer 4-4 has a connection data section 42, a call command section 44 and a timer 46. The connection data section 42 manages necessary dial numbers for calling the terminals to be connected, and gives the dial numbers to the control port 16. The call command section 44 gives to the control port 16 a call command to the terminals 20a-4 through 20c-4 from the communication line interfaces 11a through 11c.

The timer 46 sets a time to preset a video conference. More specifically, the timer 46 sets a start time for connecting the terminals with the communication line 3 and an ending time for disconnecting the terminals with the communication line 3 and gives such timer data to the control port 16.

The first terminal 20a-4 has a CRT 21a, and a first communication line interface 23a. The second terminal 20b-4 has a CRT 21b, and a second communication line interface 23b. Likewise the third terminal 20c-4 has a CRT 21c, and a third communication line interface 23c. The first through third terminals 23a through 23c are designed so as to wait any calling from the video conference control unit 1-4 without calling the video conference control unit 1-4.

Figure 9:
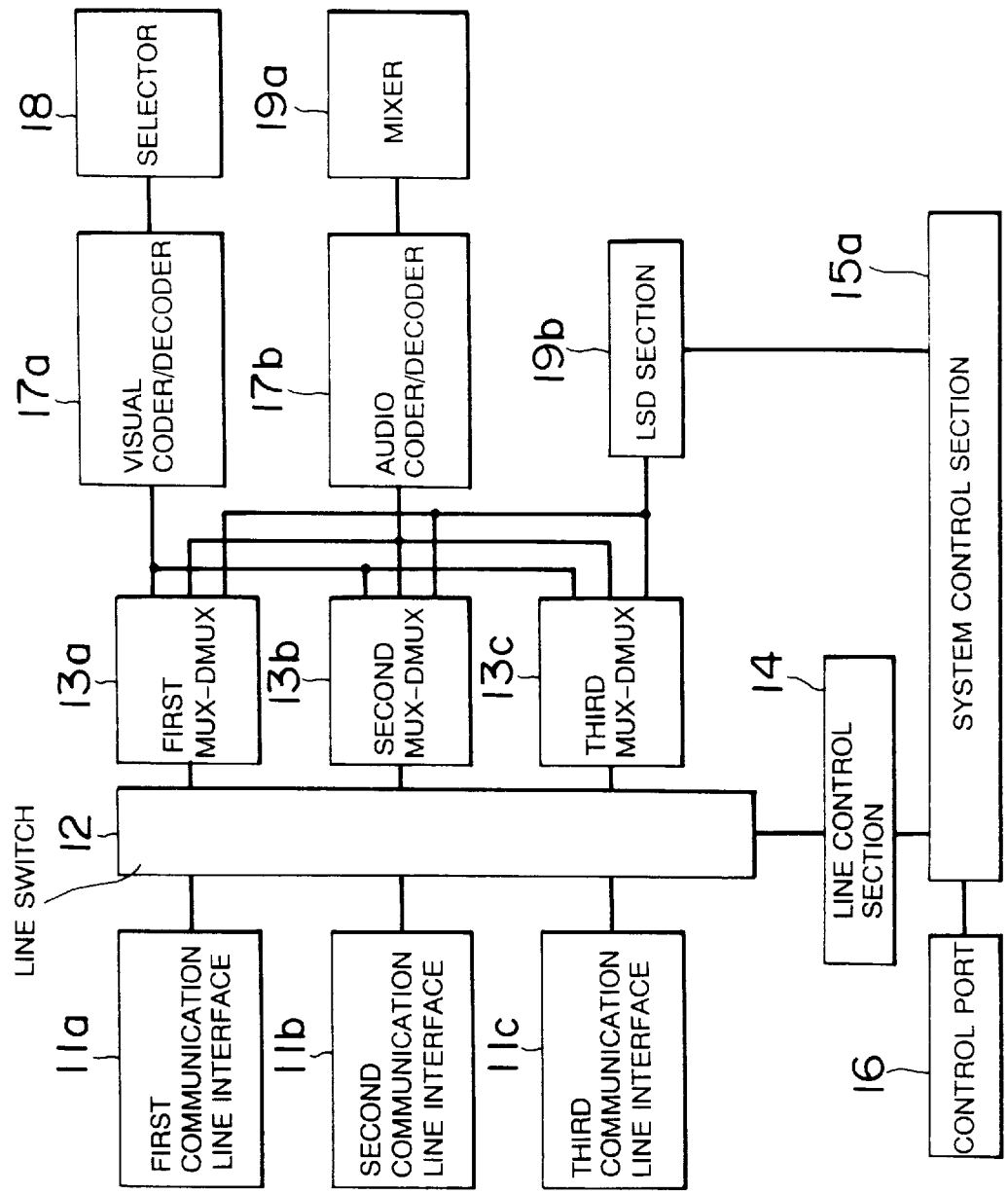
FIG. 9 is a structural block diagram showing a video conference control unit of the fourth embodiment.

FIG. 9 is a structural block diagram showing a video conference unit of the fourth embodiment. In FIG. 9, the control port 16 receives connection data from the connection data section 42, a call command from the call command section 44, and timer data from the timer 46. The system control section 15a controls, according to the connection data, the call command and the timer data received from the personal computer 4-4 via the control port 16, calls the terminals via the communication line interfaces 11a through 11c and controls the line control section 14.

Figure 10:
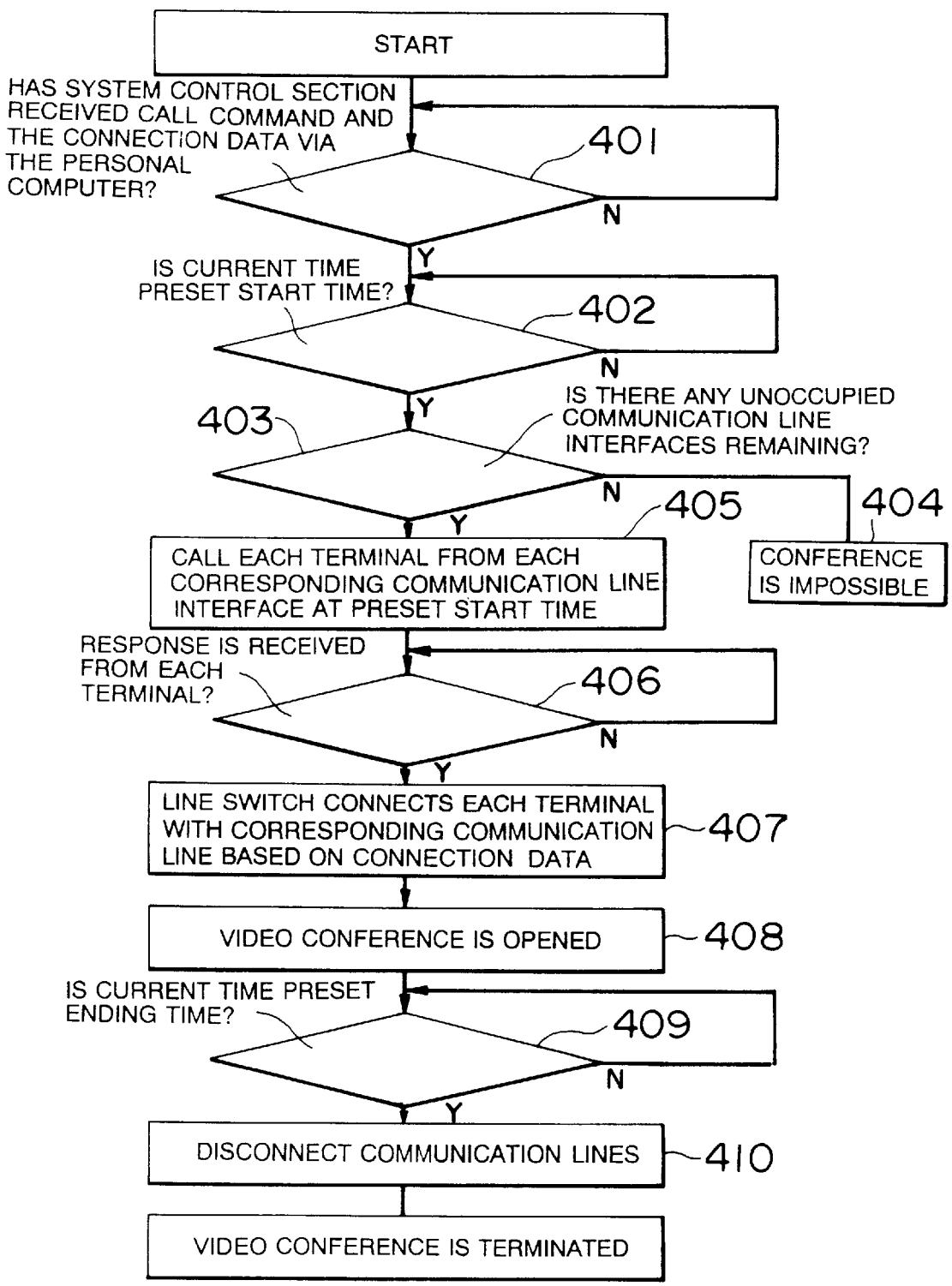
FIG. 10 is a flow chart illustrating a multi-site video conference controlling method according to the fourth embodiment of the present invention.

In the arrangement shown in FIG. 9, the other parts or elements are similar to those of the second embodiment shown in FIG. 4; so their description is omitted here. A multi-site video conference control method according to the fourth embodiment will now be described with reference to FIG. 10.

First, the call command section 44 in the personal computer 4-4 supplies the call command to the control port 16, and the connection data section 42 supplies the connection data to the control port 16. Simultaneously, the timer 46 supplies the timer data to the control port 16.

Then the system control section 15a determines whether or not the call command, the connection data and the timer data have been received via the control port 16 (Step 401).

If these data are received, the system control section 15a determines whether or not the current time is a start time set in the timer 46 to preset the conference (Step 402).

When the current time is the preset start time, the system control section 15a determines whether or not there is any unoccupied communication line interfaces remaining (Step 403). In the absence of any unoccupied communication line interfaces, the conference is impossible (Step 404).

In the presence of such unoccupied communication line interfaces, the system control section 15a calls the first through third terminals 20a-4 through 20c-4 from the first through third communication line interfaces 11a through 11c, respectively, at the preset start time for opening the conference, based on the call command and the connection data (step 405).

Further, the video conference control unit 1-4 determines whether or not responses are received from the first through third terminals 20a-4 through 20c-4 (Step 406). If such responses are received from the first through third terminals 20a-4 through 20c-4, the line control section 14 renders the line switch 12 operative to connect the first through third terminals 20a-4 through 20c-4 with the corresponding first through third communication lines 3a through 3c (Step 407). In other words, the line switch 12 connects the communication line interfaces 11a through 11c with the MUX/DMUX 13a through 13c.

As a result, a multi-site video conference is ready to open in which visual data and audio data are communicated among the terminals 20a-4 through 20c-4 (Step 408).

Then the system control section 15a determines whether or not the current time is the preset ending time set in the timer 46 (Step 409). When the current time is the preset ending time from the timer 46, the line control section 14 renders the line switch 12 operative to disconnect the terminals 20a-4 through 20c-4 corresponding to the communication lines 3a through 3c (Step 410). The multi-site video conference will thereby be terminated.

Thus it is possible to start the video conference simply by calling the terminals from the control port 16 without calling from any terminal. In particular, it would be unnecessary to search for any unoccupied communication line interface of the video conference control unit 1-4.

With the timer 46, it is possible to realize a reserving feature by means of setting start and ending times of a video conference.

In the fourth embodiment, when responses have been received from all of the terminals to be connected, a video conference is opened. Alternatively, a conference may be automatically opened after the lapse of a predetermined time from the preset start time.

<Embodiment 5>

Figure 11:
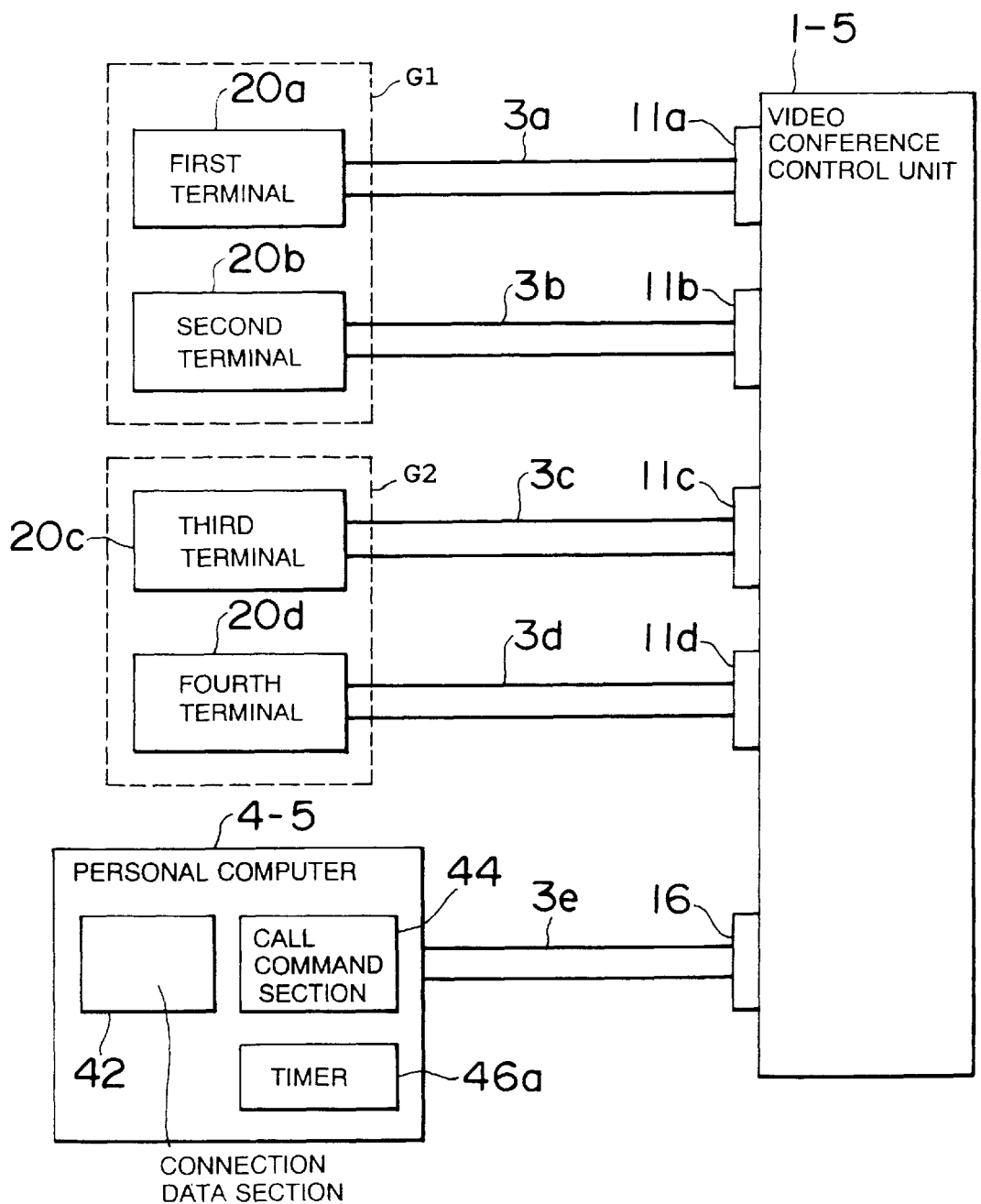
FIG. 11 is a structural block diagram showing a multi-site video conference control system according to a fifth embodiment of the present invention.
Figure 12:
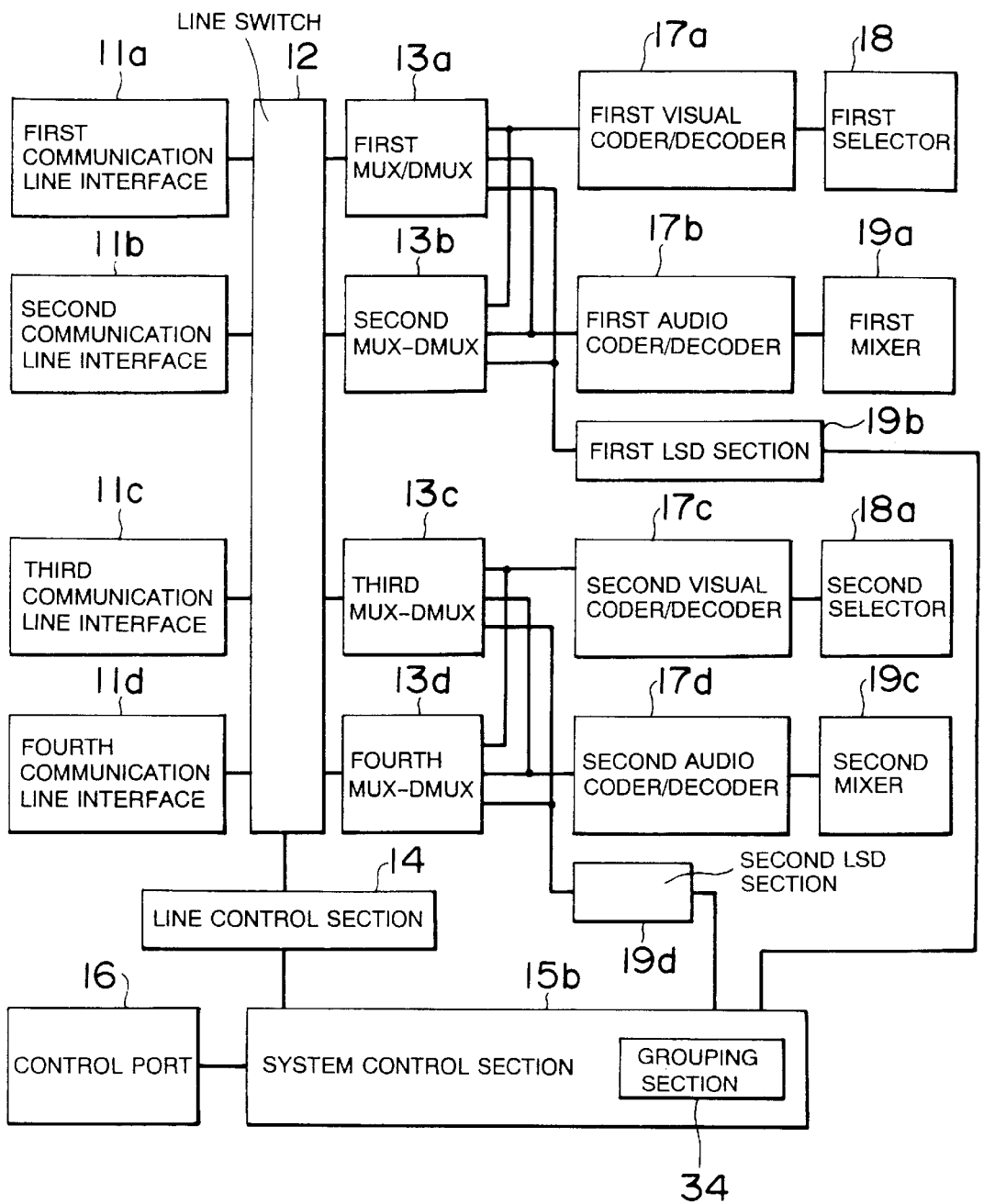
FIG. 12 is a structural block diagram showing a video conference control unit of the fifth embodiment.

A fifth embodiment of the invention will now be described. FIG. 11 is a structural block diagram showing a multi-site video conference control system according to the fifth embodiment. FIG. 12 is a structural block diagram showing a video conference control unit of the fifth embodiment.

The fifth embodiment is characterized by dividing a number of terminals 20a through 20d into two groups: a first group G1 composed of the terminals 20a and 20b, and a second group G2 composed of the terminals 20c and 20d. The first through third terminals 20a through 20c are identical in construction with those of the third embodiment of FIG. 6. The fourth terminal 20d also is identical in construction with the first through third terminals 20a through 20c. In use, the fourth terminal 20d is connected to the communication line interface 11d via the communication line 3d.

Further, the video conference control unit 1-5 has a control port 16. The control port 16 is connected to a system control section 15 and is also connected to a personal computer 4-5 via a fifth communication line 3e.

The personal computer 4-5 has a connection data section 42, a call command section 44, and a timer 46a. The connection data section 42 and the call command section 44 are identical in construction with those of the fourth embodiment, so their detailed description is omitted here.

The timer 46a sets preset times for a video conference with respect to every group. More specifically, the timer 46a sets a start time for connecting the terminals of every group with the communication line 3 and an ending time for disconnecting the terminals with the communication line 3, and then gives such timer data to the system control section 15 via the control port.

As shown in FIG. 12, first and second communication line interfaces 11a and 11b, first and second MUX/DMUX 13a and 13b and a first video coder/decoder 17a are provided in association with the first group G1. Additionally, a first audio coder/decoder 17b, a first selector 18, a first mixer 19a and a first LSD section 19b are provided in association with the first group G1.

Third and fourth communication line interfaces 11c and 11d, third and fourth MUX/DMUXs 13c and 13d and a second visual coder/decoder 17c are provided in association with the second group G2. Additionally, a second audio coder/decoder 17d, a second selector 18a, a second mixer 19c and a second LSD section 19d are provided in association with the second group G2.

The system control section 15b has a grouping section 34. The grouping section 34 sets group data for dividing a number of terminals 20a through 20d into groups. The grouping section 34 sets data on association between the terminals and the groups. Here the grouping section 34 sets the terminals 20a and 20b in the first group G1, and the terminals 20c and 20d in the second group G2.

The system control section 15b calls the terminals in terms of groups according to the group data received from the grouping section 34 via the control port 16 and controls connection and disconnection with the communication lines. The other parts or elements of this embodiment are identical in construction with those of the fourth embodiment.

A multi-site video conference control method according to the fifth embodiment will now be described with reference to the flow chart of FIG. 13.

First, the call command section 44 in the personal computer 4-5 supplies the call command to the control port 16 and the connection data section 42 supplies the connection data to the control port 16. Simultaneously the timer 46a supplies the timer data to the control port 16.

The system control section 15b determines whether or not the call command, the connection data and the timer data are received from the personal computer 4-5 (Step 501). If these data are received, the system control section 15b determines whether or not the current time is the start time preset in the timer 46a for every group (Step 502).

Now assuming that the current time is the preset start time for the first group G1, the system control section 15b accesses terminal data for the terminals 20a and 20b, i.e. group data for the first group G1, from the grouping section 34 (Step 503).

Then the system control section 15b determines whether or not there are any unoccupied communication line interfaces remaining (Step 504). In the absence of any unoccupied communication line interface, the intended conference is impossible (Step 505).

If there are some communication line interfaces remaining unoccupied, the system control section 15b calls the first and second terminals 20a and 20b from the first and second communication line interfaces 11a and 11b, respectively, at the preset start time for the first group G1, based on the call command and the connection data (Step 506).

Further, the video conference control unit 1-5 determines whether or not responses are received from the first and second terminals 20a and 20b (Step 507). If responses have been received from the first and second terminals 20a and 20b, the line control section 14 renders the line switch 12 operative to connect the first and second terminals 20a and 20b with the corresponding first and second communication lines 3a and 3b (Step 508).

In other words, the line switch 12 connects the communication line interfaces 11a and 11b with the MUX/DMUXs 13a and 13b, respectively.

As a result, a multi-site video conference using visual data and audio data to be communicated between the first and second terminals 20a and 20b is ready to open (Step 509).

Then the system control section 15b determines whether or not the current time is the preset ending time for the first group G1 (Step 510). When the current time coincides with the preset ending time supplied from the time 46, the line control section 14 renders the line switch 12 to disconnect the first and second terminals 20a and 20b with the corresponding first and second communication lines 3a and 3b (Step 511), thereby terminating the multi-site video conference.

In the meantime, in Step 502, when the current time is the preset start time for the second group G2, the same process as in Steps 503 through 511 will be performed. In other words, calling is performed with respect to the third and fourth terminals 20c and 20d to connect these two terminals with the corresponding communication lines 3c and 3d. As a result, the conference with respect to the second group G2 is ready to open.

Thus with the video conference control unit 1-5, it is possible to open the video conference with respect to the two groups G1 and G2. Alternatively, the video conference terminals may be divided into three or more groups, and each group may be composed of three or more terminals.

Further, the personal computer 4-5 may perform the maintenance operation and self-diagnosis of the video conference control unit 1-5.

In another alternative form, the fifth embodiment may be combined with the second embodiment or the fourth embodiment. Various other combinations may be suggested.

What is claimed is:

1. A system for controlling a multi-site video conference over communication lines, comprising:
   video conference terminals respectively situated at a number of sites; and
   a video conference control unit to interconnect said video conference terminals via the communication lines to open the multi-site video conference;
   each of said video conference terminals including:
      communication line interface means for calling said video conference control unit; and
      connection data means for managing connection data for all of said video conference terminals to be connected and for transmitting, at one time, all the connection data of selected video conference terminals to said video conference control unit; and said video conference control unit including:

control calling means for calling, at one time, all the selected video conference terminals corresponding to the connection data transmitted from said connection data means, based on the calling by said communication line interface means of one of said video conference terminals; and connection controlling means for connecting the one of said video conference terminals whose communication line interface means called said video conference control unit and the selected video conference terminals called by said control calling means with the communication lines.

2. A multi-site video conference system as claimed in claim 1, wherein said video conference control unit further includes a number of port means to be connected to the communication lines, and wherein when any of said port means remain unoccupied, said control calling means calls the selected video conference terminals, which correspond to the connection data and are to be connected, via any of said port means which remain unoccupied, and when all of said port means are already occupied, said control calling means determines that the multi-site video conference cannot be opened.

3. A multi-site video conference control system as claimed in claim 1, wherein said video conference control unit further includes grouping means for dividing said video conference terminals into groups according to group data and for associating the respective group data with said video conference terminals of the corresponding group, and said control calling means calls the selected video conference terminals corresponding to the group data from said grouping means.

4. A multi-site video conference control system as claimed in claim 1, wherein said connection data are inherent dial numbers given to the respective terminals.

5. A system for controlling a multi-site video conference over communication lines, comprising:

video conference terminals respectively situated at a number of sites;

a video conference control unit to interconnect said video conference terminals via the communication lines and to open the multi-site video conference; and a control terminal to manage connection data for all of said video conference terminals to be connected and to transmit the connection data of selected video conference terminals to said video conference control unit, said control terminal including calling command means for supplying a calling command;

said video conference control unit including:

control port means for receiving the connection data and the calling command transmitted from said control terminal;

control calling means for receiving the calling command and the connection data from said control terminal via said control port means and for calling all of the selected video conference terminals corresponding to the connection data; and connection controlling means for connecting all of the selected video conference terminals corresponding to the connection data called by said control calling means, with the communication lines.

6. A multi-site conference control system as claimed in claim 5, wherein said video conference control unit further comprises a number of port means to be connected with the communication lines, and wherein when any of said port means remain unoccupied, said control calling means calls the selected video conference terminals, which correspond to the connection data and are to be connected, via any of said port means which remain unoccupied, and when all of said port means are already occupied, said control calling means determines that the multi-site video conference cannot be opened.

7. A multi-site video conference control system as claimed in claim 5, wherein said video conference control unit further includes grouping means for dividing said video conference terminals into groups according to group data and for associating the respective group data with said video conference terminals of the corresponding group, and wherein said control calling means calls the selected video conference terminals corresponding to the group data from said grouping means.

8. A multi-site video conference control system as claimed in claim 5, wherein said connection data are inherent dial numbers given to the respective terminals.

9. A multi-site video conference control system as claimed in claim 5, wherein said control terminal includes setting means for setting at least one of a start time and an ending time of the video conference preset the video conference.

10. A multi-site video conference control system as claimed in claim 5, wherein said control terminal includes calling command means for supplying a calling command to said control calling means via said control port means.

11. A method of controlling a multi-site video conference to be held by connecting video conference terminals, which are respectively situated at a number of sites, with a video conference control unit via communication lines, said method comprising:

managing connection data for all of the video conference terminals to be connected;

calling the video conference control unit from one of the video conference terminals and transmitting, at one time, all the connection data of selected video conference terminals to the video conference control unit;

calling, by the video conference control unit, at one time, all of the selected video conference terminals corresponding to the connection data transmitted to the video conference control unit based on said calling by the one of the video conference terminals; and connecting, by the video conference control unit using the communication lines to open the multi-site video conference, the one of the video conference terminals from which said video conference control unit is called and all of the selected video conference terminals called in said calling by the video conference control unit.

12. A multi-site video conference controlling method as claimed in claim 11, wherein said calling by said video conference control unit comprises:

calling all of the selected video conference terminals, which correspond to the connection data and are to be connected, via any unoccupied ports to be connected with the communication lines; and determining, when all of the ports are already occupied, that the multi-site video conference cannot be opened.

13. A multi-site video conference controlling method as claimed in claim 11, further comprising dividing the video conference terminals into groups according to group data and associating respective group data with each of the video conference terminals of a corresponding group, and wherein said calling by said video conference control unit includes calling the selected video conference terminals corresponding to the group data.

14. A multi-site video conference controlling method as claimed in claim 11, further comprising outputting connection data, including inherent dial numbers, to respective terminals.

15. A method of controlling a multi-site video conference to be held by connecting video conference terminals, which are respectively situated at a number of sites, with a video conference control unit via communication lines, said method comprising the steps of:

(a) managing, in a control terminal, connection data for all of the video conference terminals to be connected and transmitting, at one time, all the connection data of selected video conference terminals to the video conference control unit;

(b) supplying the connection data, which is to be transmitted, to a control port;

(c) supplying a calling command from the control terminal to the video conference control unit via the control port;

(d) calling, at one time, all of the selected video conference terminals corresponding to the connection data supplied from the control ports; and (e) connecting all of the selected video conference terminals corresponding to the connection data, called in said calling in step (d), with the communication lines.

16. A multi-site video conference controlling method as claimed in claim 15, wherein said calling in step (d) comprises the substeps of:

(d1) calling all of the selected video conference terminals, which correspond to the connection data and are to be connected, via any unoccupied ports to be connected with the communication lines; and (d2) determining, when all ports are already occupied, that the multi-site video conference cannot be opened.

17. A multi-site video conference controlling method as claimed in claim 15, further comprising the step of (f) dividing the video conference terminals into groups according to group data and associating respective group data with each of the video conference terminals of a corresponding group, and wherein said calling in step (d) includes calling the selected video conference terminals corresponding to the group data.

18. A multi-site video conference controlling method as claimed in claim 15, further comprising the step of (f) outputting connection data, including inherent dial numbers, to respective terminals.

19. A multi-site video conference controlling method as claimed in claim 15, wherein said managing in step (a) includes setting a start time and/or an ending time of the video conference to preset the video conference.

20. A video conference control unit, for opening a multi-site video conference, connectable via communication lines to video conference terminals respectively situated at a number of sites, the video conference terminals including a calling terminal, said video conference control unit comprising:

control calling means for calling, at one time, selected video conference terminals corresponding to connection data transmitted from the calling terminal; and connection control means for connecting the calling terminal and the selected video conference terminals called by said control calling means, with the communication lines.

21. A video conference control unit as claimed in claim 20, further comprising a number of port means to be connected to the communication lines, and wherein, when any of said port means remain unoccupied, said control calling means calls all the selected video conference terminals, which correspond to the connection data and are to be connected, via any of said port means which remain unoccupied, and when all of said port means are already occupied, said control calling means determines that the multi-site video conference cannot be opened.

22. A video conference control unit as claimed in claim 20, further comprising grouping means for dividing the video conference terminals into groups according to group data and for associating respective group data with the video conference terminals of each corresponding group, and wherein said control calling means calls the selected video conference terminals corresponding to the group data defined by said grouping means.

23. A video conference terminal connectable by a video conference control unit to a plurality of video conference terminals respectively situated at a number of sites, comprising:

communication line interface means for calling the video conference control unit to open a multi-site video conference; and connection data means for managing connection data for all of the video conference terminals to be connected with the video conference control unit and for transmitting, at one time, all the connection data to the video conference control unit.

24. A video conference control unit, for opening a multi-site video conference, connectable via communication lines to a control terminal and video conference terminals respectively situated at a number of sites, comprising:

control port means for inputting connection data of selected video conference terminals to be connected and a calling command transmitted from the control terminal which manages the calling command and the connection data for all of the video conference terminals to be connected;

control calling means for calling, at one time all of the selected video conference terminals to be connected corresponding to the connection data supplied from said control port means; and connection control means for connecting via the communication lines all of the selected video conference terminals to be connected, which are called by said control calling means based on the connection data.

25. A video conference control unit as claimed in claim 24, further comprising a number of port means to be connected with the communication lines, and wherein, when any of said port means remain unoccupied, said control calling means calls all the selected video conference terminals, which correspond to the connection data and are to be connected, via any of said port means which remain unoccupied, and when all of said port means are already occupied, said control calling means determines that the multi-site video conference cannot be opened.

26. A video conference control unit as claimed in claim 24, further comprising grouping means for dividing the video conference terminals into groups according to group data and for associating respective group data with the video conference terminals of each corresponding group, and wherein said control calling means calls selected video conference terminals corresponding to the group data defined by said grouping means.

27. A control terminal device causing the connection of video conference terminals, respectively situated at a number of sites, by a video conference control unit which opens a video conference, comprising:

connection data means for managing connection data for all of the video conference terminals which are to be interconnected and for supplying the connection data of selected video conference terminals to be interconnected to the video conference control unit;

call command means for supplying to the video conference control unit a call command for calling all of the selected video conference terminals corresponding to the connection data; and setting means for setting time data including at least one of a start time and an ending time of the video conference to preset the video conference and for outputting the time data to the video conference control unit.

28. A system for controlling a multi-site video conference using communication lines, comprising:

a plurality of video conference terminals respectively located at a plurality of sites;

connection data control means for managing connection data for all of said video conference terminals to be interconnected and outputting a calling command and the connection data of selected video conference terminals to be interconnected; and a video conference control unit for interconnecting the selected video conference terminals via the communication lines to open the video conference based on the connection data and the calling command, said video conference control unit including control calling means for calling all of the selected video conference terminals corresponding to the connection data; and connection controlling means for connecting the selected video conference terminals called by said control calling means with the communication lines.

29. A system for controlling a multi-site video conference according to claim 28, wherein said plurality of video conference terminals comprises:

communication line interface means provided at each of said plurality of video conference terminals for calling said video conference control unit.

30. A system for controlling a multi-site video conference according to claim 29, wherein said plurality of video conference terminals each further comprises a CRT.

31. A system for controlling a multi-site video conference according to claim 30, wherein said video conference control unit further comprises a control port, said system further comprising:

a personal computer connected to said control port, said personal computer including:
a data connection unit;
a call command section; and
a timer.

32. A system for controlling a multi-site video conference according to claim 30, wherein said plurality of video conference terminals further comprises:

connection data means provided at each of said plurality of video conference terminals for managing connection data for one or more other terminals to be connected and for transmitting the connection data to said video conference control unit.

33. A system for controlling a multi-site video conference according to claim 28, wherein said video conference control unit further comprises a control port, said system further comprising a data processing unit connected to said control port.

* * * * *